United States Patent [19]

Boyd

[11] Patent Number: 4,552,126
[45] Date of Patent: Nov. 12, 1985

[54] RADIATION CONCENTRATOR

[76] Inventor: John O. Boyd, 6611 Burkett St., Houston, Tex. 77021

[21] Appl. No.: 598,739

[22] Filed: Apr. 10, 1984

[51] Int. Cl.$^4$ .............................................. F24J 3/02
[52] U.S. Cl. ................................. 126/451; 126/426; 350/612
[58] Field of Search ............... 126/426, 438, 439, 441, 126/451, 417; 350/288, 293, 299

[56] References Cited

U.S. PATENT DOCUMENTS

| 3,406,404 | 10/1968 | Maier | 126/426 X |
| 4,084,581 | 4/1978 | Vigoureux | 126/438 |
| 4,126,123 | 11/1978 | Hall | 126/426 |
| 4,249,511 | 2/1981 | Krisst et al. | 126/451 X |
| 4,251,135 | 2/1981 | Stone | 126/451 X |
| 4,350,412 | 9/1982 | Steenblik et al. | 126/438 X |

FOREIGN PATENT DOCUMENTS 2449854  10/1980  France .................. 126/451

Primary Examiner—Margaret A. Focarino

[57] ABSTRACT

A solar radiation concentrator comprises a balloon formed of two concentric flat disc shaped flexible sheets of Mylar type plastics material, each disc having on the inwardly facing surface thereof a plurality of concentric radially separated reflective belts with the belts on one disc being staggered relative to those on the other and positioned so that when the balloon is inflated parallel light from the sun can pass through the interbelt regions on one disc to the belts on the other disc and be reflected back to the belts on the one disc and reflected from the latter through the inter-belt regions on the other disc to a common focus.

15 Claims, 2 Drawing Figures

4,552,126

RADIATION CONCENTRATOR

SUMMARY OF THE INVENTION

This invention relates to means for concentrating radiation, especially the parallel rays of the sun.

The radiation is concentrated by reflection of a parallel beam from annular concave reflecting belts of a first spherical surface to annular concave reflecting belts of a second coaxial opposite spherical surface and thence to a focus, there being annular gaps between the belts of the second surface to allow passage of parallel light rays on to the belts of the first surface and annular gaps between the belts of the first surface to allow passage of the reflected rays of light to the focus. The spherical surfaces may be provided by an inflated balloon, whereby by deflating the balloon, the concentrator can be packed flat. Or the spherical surfaces may be the envelopes of fixed wire cages.

BRIEF DESCRIPTION OF THE DRAWINGS

For a detailed description of a preferred embodiment of the invention reference will be made to the accompanying drawings wherein.

DESCRIPTION OF PREFERRED EMBODIMENT

Figure 1:
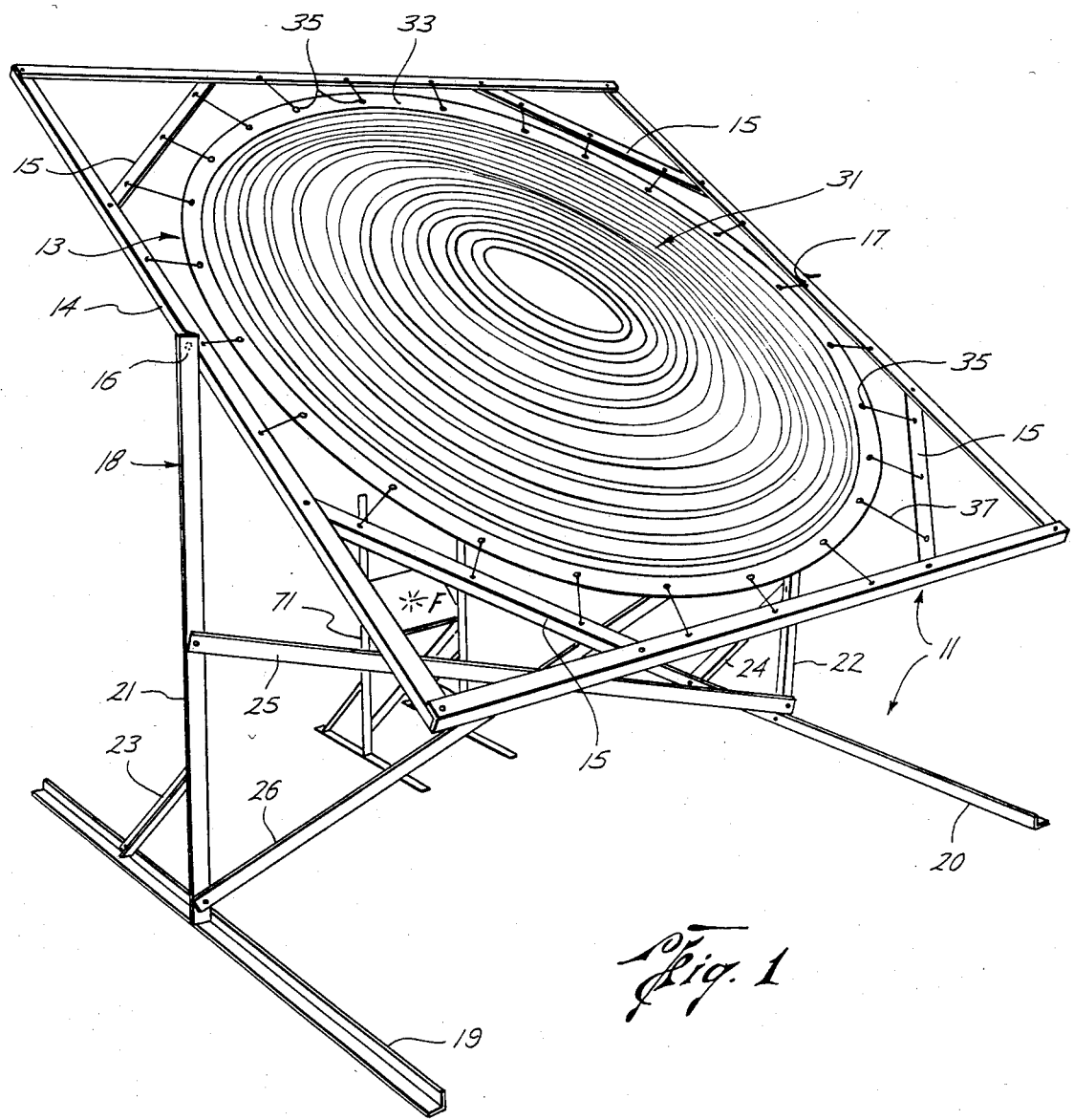
FIG. 1 is a pictorial view of a concentrator embodying the invention.

Referring now to FIG. 1, there is shown a radiation concentrator comprising a collapsible carriage 11 carrying collapsible reflector 13.

The carriage includes a rectangular frame 14 having four corner braces 15. The frame is pivotally mounted at 16, 17 on stand 18. The stand includes two parallel base members 19, 20 to which are connected vertical posts 21, 22, held upright by angle braces 23, 24, and interconnected by cross braces 25, 26. All members of the carriage are aluminum angles except the cross braces which are flat aluminum bars. For quick assembly and disassembly the members are connected together by bolts and wing nuts, the bolts going through holes in the members. The bolts connecting the frame to the stand can be loosened and tightened whereby the plane of frame 14 can be set at any angle to the plane of base members 19, 20.

Reflector 13 comprises a transparent, lens shaped balloon 31 having a peripheral flange 33 in which are annularly disposed a series of circumferentially spaced eyelets 35. Lacing 37 passing through the eyelets connects the balloon to the frame.

Figure 2:
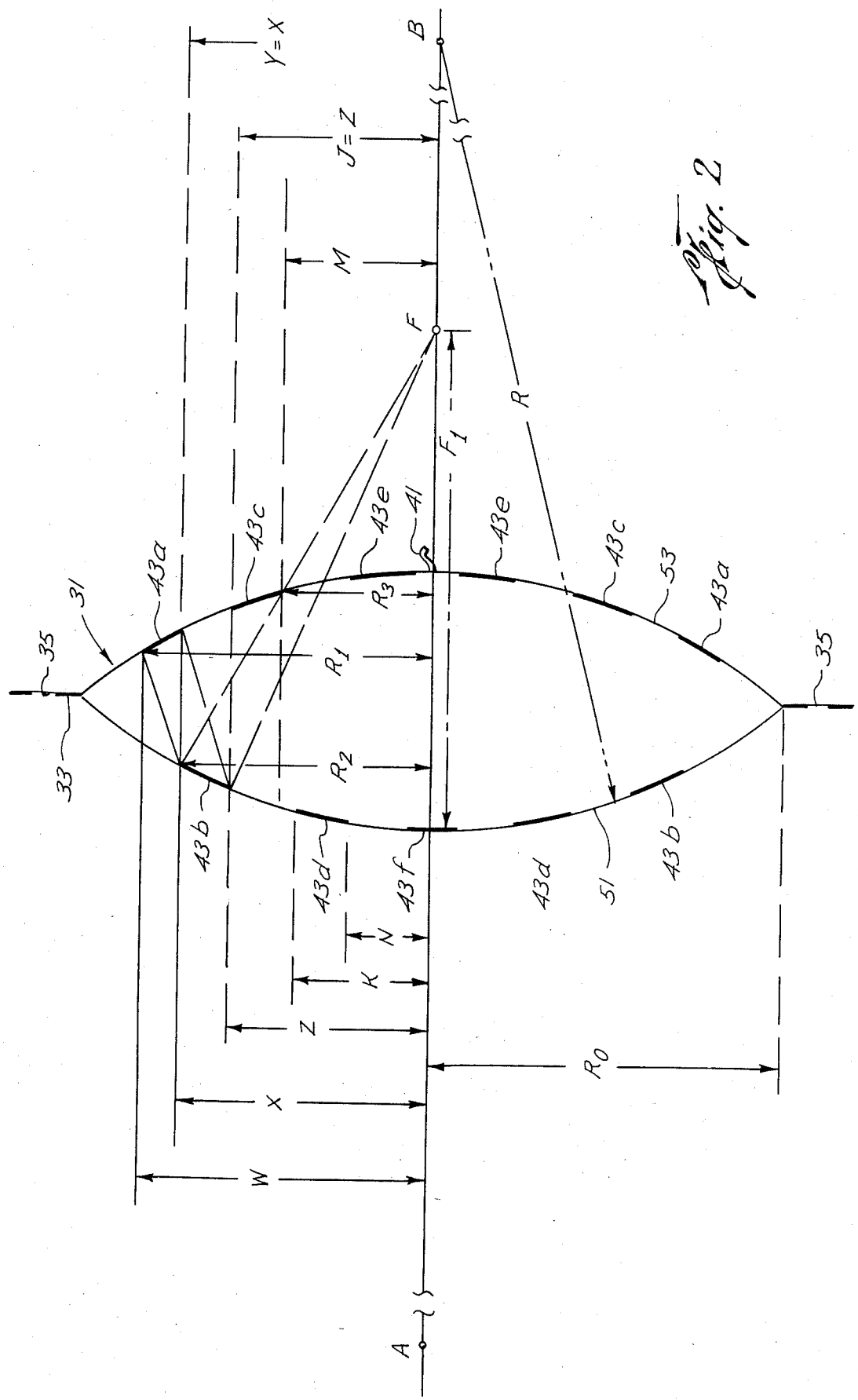
FIG. 2 is an axial section through the reflector portion of the concentrator. In this figure are drawn in light ray paths and other construction lines for solution of the geometrical problem of layout of a concentrator according to the invention; the ray pattern and construction lines are not to scale nor true angular placement.

Referring now to FIG. 2, balloon 31 may be made of two circular discs of flexible sheet plastics material such as Mylar, the sheets being connected together at their periphery, and eyelets 35 clamped thereabout. An inlet-outlet tube 41 at the center of the balloon provides a flow passage communicating with the interior of the balloon which can be closed by folding over the tube and clamping it, e.g. by tucking it under a strap (not shown) cemented to the exterior of the balloon near its center.

Each disc of the balloon is provided with a plurality of concentric, radially separated, annular belts or rings of reflective interior surfaces 43 (a, b, etc.), the rings on one disc being generally staggered relative to those on the other disc, being aligned more or less with the inter-ring spaces of such other disc.

FIG. 2 shows the disposition of the parts of reflector 13 when the balloon is inflated. As shown, discs 51, 53 of the balloon assume spherical shapes. Inwardly facing, radially separated reflective belts 43a, 43c, 43e on disc 53 are preferably provided by metalizing the interior surface of the balloon, although rings of reflective flexible plastics material can be cemented to the interior of the disc. Since the disc is transparent, the reflective belts could also be provided by suitable treatment of the exterior of the disc. Inwardly facing radially separated reflective belts 43b, 43d, 43f on disc 51 are constructed in like manner to belts on disc 53 but are staggered relative to belts 43a, 43c, 43e. All the belts on each disc are spherical zones whose spherical centers, A, B are the same as those of the discs of the inflated balloon, centers A, B defining axis A B of the concentrator. The perimeters of the reflective belts are latitude circles centered in axis A B, in other words, the belts are geometrical zones defined between parallel planes perpendicular to axis A B.

The reflective belts or zones 43a, 43c, 43e on the disc 53 are positioned to receive parallel light, e.g. solar radiation, directly along axis A B between belts 43b, 43d, 43f, and reflect it towards reflective belts or zones 43b, 43d, 43f, respectively, the latter belts in turn reflecting the light between belts 43a, 43c, 43e to common focus F, which is on line A B.

It is to be noted that although the focal length of a spherical mirror is about one-half of the spherical radius, the focus of the concentrator is about one-quarter the spherical radius.

The belts on disc 53 may be called the receptor belts and those on disc 51 the focus belts. The geometrical problem in designing a specific reflector 13 is as follows:

Given:

R = spherical radius of discs 51, 53 when balloon is inflated to spherical lens shape. Having chosen some desired focal length ($F_1$ infra), R will be 4 $F_1$.

$R_o$ = distance from axis A B to intersection of spherical surfaces of discs 51, 53.

$R_1$ = distance from axis A B at which a parallel ray strikes receptor belt.

Find $R_2$ = distance from axis A B at which ray from receptor belt strikes focus belt.

Find $R_3$ = distance from axis A B at which ray from focus belt intersects receptor disc.

These turn out to be:

$$R_2 = [C - B(R^2 - C^2 + B^2 R^2)^{\frac{1}{2}}]/(1 + B^2)$$

Where:
$F_0 = R - R^2/2(R^2 - R_1^2)^{\frac{1}{2}}$
$B = R_1[F_0 - R + (R^2 - R_1^2)^{\frac{1}{2}}]$
$C = BF_0 - 2B(R - [R^2 - R_0^2]^{\frac{1}{2}}) + BR$

AND $$R_3 = [-DE \pm R_2 \cdot (-E^2 + R^2 R_2^2 + D^2 R^2)^{\frac{1}{2}}]/(R_2^2 + D^2)$$

Where:
$E = 2R_2(R - [R^2 - R_0^2]^{\frac{1}{2}}) - R_2 F_1 - R_2 R$
$D = F_1 - S_2$ $S_2 = R - (R^2 - R_2^2)^{\frac{1}{2}}$
$F_1 = R - (R^2 - R_2^2)^{\frac{1}{2}} + R_2 \tan(A_2 - A_1)$
$A_2 = \arctan(Z/[1 - Z^2]^{\frac{1}{2}})$
$Z = R_2/R$
$A_1 = \arctan(Y/[1 - Y^2]^{\frac{1}{2}}) - 2A$
$Y = (1 - [R_2/R]^2)^{\frac{1}{2}}$
$2A = \arctan(R_1/[F_0 - R + (R^2 - R_1^2)^{\frac{1}{2}}])$ The foregoing formulas can be used for designing a concentrator as follows:

A. Consider first the determination of the positions and extents of the outer receptor and focus belts 43a, 43b.
1. As the radius of the outer periphery of the outer receptor belt 43a select some radius W less than $R_o$.
2. Using the value W as $R_1$, determine $R_2$ from the formulas. This will be X, the radius of the outer periphery of the outer focus belt 43b.
   (If a radius less than X were employed, some of the radiation from the receptor belt would be lost. If a radius larger than X were employed, the added area of focus belt would receive no light from the receptor belt. In the latter connection, note that the concentrator is used to concentrate solar radiation so that the rays falling on the concentrator are parallel. Also, it is assumed that the concentrator has been positioned with its axis A B pointing toward the sun.)
3. The radius Y of the inner periphery of the outer receptor belt is equal to X, the radius of the outer periphery of the outer focus belt. The added belt surface provided by any smaller value of Y would receive no light, the light being cut off by the outer focus belt. Any larger value of Y would reduce the area of belt surface available to receive light.
4. Using the value X as $R_1$, determine $R_2$ from the formulas. This will be Z, the radius of the inner periphery of the outer focus belt 43b.

B. Consider next the determination of the positions and extents of the next-to-outer receptor and focus belts 43c, 43d.
1. As the radius J of the outer periphery of the receptor belt 43c, choose the value Z. Any additional surface provided by a larger value of Z would receive no light, such light being cut off by focus belt 43b.
2. Using the valve J (=Z) as $R_1$, determine $R_2$ from the formulas. This will be K, the radius of the outer periphery of the next-to-outer focus belt 43d.
   (If a radius less than K were employed, some of the radiation from receptor belt 43c would be lost. If a radius larger than K were employed, the added area of focus belt would receive no light from receptor belt 43c.)
3. Using the valves W and X for $R_1$ and $R_2$, determine $R_3$ from the formulas. This will be M, the radius of the inner periphery of the next-to-outer receptor belt 43c.
   It turns out that M will be larger than K, so that there will be no interference by the outer periphery of focus belt 43d cutting off light from receptor belt 43c.
4. Using M as the value $R_1$, determine $R_2$. This will be N, the radius of the inner periphery of focus belt 43d.

C. Repeat procedure B to determine the positions and extents of further inner pairs of receptor and focus belts.

The foregoing formulas for determining the radius of each belt periphery measured from axis A B can be programmed into a computer for solution in designing a particular concentrator. It is found that maximum concentration, i.e. intensity of radiation at the focus, occurs when the focal length, measured from the intersection of axis A B with the focus disc 53, is about equal to the radius $R_o$ of the perimeter of the lens shaped concentrator measured from the axis A B.

Instead of using algebraic formulas and a computer, a design could be made by drawing the reflector accurately and measuring the distances.

A testing embodiment of the invention was built as follows:

The material needed for the concentrator consists of two sheets of clear Mylar or clear cast vinyl and an equal area of reflective Mylar with adhesive backing. Two discs are cut from the clear plastic. An air inlet is glued to the center of one disc and the two discs are glued together at the edge. This assembly is attached to a suitable frame. The frame shown in the drawings is made of aluminum angle. The reflective Mylar surfaces consist of concentric circles or rings. The rings alternate on the inside of the top and bottom clear plastic sheets and the incoming solar energy is reflected first from the bottom reflector rings to the top rings and then to the image plane. The exact radii of the ring pairs were calculated on a home computer. The rings were carefully cut from sheets of reflective Mylar using a beam compass. Each ring was applied to the clear plastic using a circle pattern as a guide.

Inflation imparts an excellent spherical shape to the assembled concentrator. When the concentrator is inflated to the proper thickness, an image of the sun will form at the focal point. The image will form at the back focal plane and thus will simulate a refracting lens or a Fresnel lens.

The four foot diameter concentrator shown in the drawings has a focal length of 29 inches and produces a two inch diameter image at the focal point. The temperature at the focal point was measured to be approximately 900° F. Cost of material for the four foot concentrator, described above, including the aluminum frame and mount, was very modest. This low cost is one of the advantages of the invention.

The concentrator is especially effective when used for direct cooking of meats and vegetables. The food to be cooked is first wrapped in aluminum foil which has been spray painted with black, high temperature resistant paint used on stoves. Access to the food, while it is cooking, is particularly easy because it is positioned behind the concentrator, e.g. on a stand 71 as shown in FIG. 1. The concentrator is very light and can easily be repositioned to track the sun.

Another advantage of this design is its portability. It can be deflated, disassembled and inserted into a tube four inches in diameter and five feet in length.

For cooking purposes, the diameter should be from three to four feet and f/nos. should be 0.5 to 0.1. Only one side of the foil wrap is painted black.

From the foregoing description, it will seem that pairs of reflection belts, one receptor and one focus, serve to concentrate a particular annular beam of parallel light, that multiple pairs are used to bring to a focus about half of the total radiation falling on the outside of the reflector disc 51, other radiation being reflected back or absorbed by the exterior surface of the focus belts. While this is less efficient than a simple continuous concave reflector, the great advantage of the construction is location of the focus on the opposite side of the concentrator from the source of radiation. Since the construction is light, a large enough diameter concentrator to concentrate a useful amount of radiation can easily be carried by a camper.

Another advantage of the construction according to the invention is that the reflecting surfaces, being on the inside of the balloon, or at least inwardly facing, are protected from the elements such as rain and dust.

Referring once more to the carriage for the reflector, frictional hinge construction as in a folding card table can be used for the bracing to enable the carriage to be folded up for transportation, or the parts can be secured together with bolts and wing nuts to permit quick assembly and disassembly.

While a preferred embodiment of the invention has been shown and described, modifications thereof can be made by one skilled in the art without departing from the spirit of the invention. For example, the concentrator could be used for microwave radiation and other radiation as well as solar radiation.

Furthermore, referring to FIG. 1, a cage formed of two sets of annular belts like 35 (and 43a, b, c, d, e, f—see FIG. 2) but made of rigid material such as metal ribbon and two sets of meridian members or curved struts like 37 but made of rigid material such as metal wire and extending all the way across from 14 through the center thereof could be employed to support the reflecting belts instead of a balloon. The cage formed of the two dish shaped sets of belts and struts connected at the perimeters of the dishes would form a skeleton to which the reflecting belts would be suitably attached, e.g. by cement, or the metal belts themselves could be made highly reflective on their inner faces.

A further characteristic of the invention that should be noted is that the widths of the focus and receptor belts and of the annular areas therebetween as determined by the formulas and procedures previously given, vary greatly, being minimum at the axis and perimeter of the concentrator and reaching a maximum at locations therebetween, being a whole order of magnitude greater at the mid-locations. For example in the test model described above, the belts and inter-belt areas were about 1/16 inch wide at the axis and perimeter of the concentrator and about 12/16 inch wide at mid-locations.

The width variation described above is not shown in the drawings which are not to scale. Also, the drawings are merely suggestive since the actual number of reflective belts on each disc in the testing model is 25, which is too large a number for easy illustration. See the accompanying photos which show the actual number of belts and their relative widths.

The following reproduction of the computer printout of the dimensions of the several sets of reflector rings gives the exact variation in the widths of the belts, calculated according to the procedure set forth hereinabove.

```
DIMENSIONS IN MILLIMETERS
RADIUS OF CURVATURE IS 3251.2
CONCENTRATOR RADIUS IS 609.6
STARTING RADIUS IS 596.9
NUMBER OF RING SETS IS 25
CONCENTRATOR WIDTH IS
   115.3226465

RING SET 1
W= 596.9
X= 594.8993256
Z= 592.5973793
M= 588.8492882
K= 585.6650383
W-X= 2.000674379
X-Z= 2.301946332
FOCAL LENGTH,F1= 710.5185609

RING SET 2
W= 592.5973793
X= 589.9533861
Z= 586.9225375
M= 582.030359
K= 577.8887023
W-X= 2.64399314
X-Z= 3.03084865
FOCAL LENGTH,F1= 711.9328024

RING SET 3
W= 586.9225375
X= 583.4560728
Z= 579.5015469
M= 573.1894099
K= 567.8689287
W-X= 3.466464658
X-Z= 3.954525982
FOCAL LENGTH,F1= 713.7595673

RING SET 4
W= 579.5015469
X= 575.0033331
Z= 569.9034186
M= 561.877394
K= 555.148006
W-X= 4.498213713
X-Z= 5.099914596
FOCAL LENGTH,F1= 716.0843609

RING SET 5
W= 569.9034186
X= 564.142539
Z= 557.6616976
M= 547.6398214
K= 539.2890421
W-X= 5.760879512
X-Z= 6.480841457
FOCAL LENGTH,F1= 718.9877524

RING SET 6
W= 557.6616976
X= 550.4040845
Z= 542.3173896
M= 530.0749186
K= 519.9449543
W-X= 7.257613051
X-Z= 8.086694926
FOCAL LENGTH,F1= 722.5298956

RING SET 7
W= 542.3173896
X= 533.3564517
Z= 523.48614
M= 508.9114864
```

K= 496.9420605
W-X= 8.96093792
X-Z= 9.870311646
FOCAL LENGTH,F1= 726.7304794

RING SET 8
W= 523.48614
X= 512.6843035
Z= 500.9445703
M= 484.0933578
K= 470.3595027
W-X= 10.80183658
X-Z= 11.73973319
FOCAL LENGTH,F1= 731.5483065

RING SET 9
W= 500.9445703
X= 488.2787434
Z= 474.7185222
M= 455.8468513
K= 440.5777192
W-X= 12.66582686
X-Z= 13.56022124
FOCAL LENGTH,F1= 736.8680073

RING SET 10
W= 474.7185222
X= 460.3163057
Z= 445.1448969
M= 424.7040862
K= 408.2718243
W-X= 14.40221651
X-Z= 15.17140873
FOCAL LENGTH,F1= 742.5023061

RING SET 11
W= 445.1448969
X= 429.2960263
Z= 412.8777363
M= 391.4646302
K= 374.3421025
W-X= 15.8488706
X-Z= 16.41829007
FOCAL LENGTH,F1= 748.2142264

RING SET 12
W= 412.8777363
X= 396.0107964
Z= 378.824426
M= 357.0992171
K= 339.7973247
W-X= 16.8669399
X-Z= 17.18637038
FOCAL LENGTH,F1= 753.7551323

RING SET 13
W= 378.824426
X= 361.451671
Z= 344.0248023
M= 322.6214433
K= 305.6240744
W-X= 17.37275498
X-Z= 17.42686872
FOCAL LENGTH,F1= 758.9063916

RING SET 14
W= 344.0248023
X= 326.6710739
Z= 309.50911
M= 288.9636526
K= 272.6770019
W-X= 17.35372835
X-Z= 17.16196389
FOCAL LENGTH,F1= 763.5106002

RING SET 15
W= 309.50911
X= 292.6460946
Z= 276.1758396
M= 256.8868598
K= 241.611935
W-X= 16.86301547
X-Z= 16.47025491
FOCAL LENGTH,F1= 767.4840811

RING SET 16
W= 276.1758396
X= 260.1777171
Z= 244.7163683
M= 226.9375935
K= 212.8655539
W-X= 15.99812251
X-Z= 15.46134888
FOCAL LENGTH,F1= 770.8112759

RING SET 17
W= 244.7163683
X= 229.8420613
Z= 215.591546
M= 199.4475317
K= 186.6714911
W-X= 14.87430696
X-Z= 14.25051527
FOCAL LENGTH,F1= 773.5278755

RING SET 18
W= 215.591546
X= 201.9892528
Z= 189.0486978
M= 174.5620136
K= 163.0972845
W-X= 13.60229323
X-Z= 12.94055502
FOCAL LENGTH,F1= 775.7007447

RING SET 19
W= 189.0486978
X= 176.7739776
Z= 165.1612622
M= 152.2819151
K= 142.0880843
W-X= 12.27472018

```
X-Z= 11.61271542
FOCAL LENGTH,F1= 777.4103497

RING SET 20
W= 165.1612622
X= 154.2002194
Z= 143.8753282
M= 132.5069162
K= 123.5076775
W-X= 10.96104275
X-Z= 10.32489126
FOCAL LENGTH,F1= 778.7381654

RING SET 21
W= 143.8753282
X= 134.1670539
Z= 125.0528771
M= 115.0732219
X= 107.1721879
W-X= 9.708274251
X-Z= 9.114176861
FOCAL LENGTH,F1= 779.7591418

RING SET 22
W= 125.0528771
X= 116.5081731
Z= 108.5069519
M= 99.78302026
X= 92.87526933
W-X= 8.544703996
X-Z= 8.001221174
FOCAL LENGTH,F1= 780.5381434

RING SET 23
W= 108.5069519
X= 101.0224679
Z= 94.02771421
M= 86.42564224
X= 80.40554229
W-X= 7.484483969
X-Z= 6.994753705
FOCAL LENGTH,F1= 781.1290259

RING SET 24
W= 94.02771421
X= 87.49581563
Z= 81.40033517
M= 74.79167411
X= 69.55779518
W-X= 6.531898584
X-Z= 6.09548046
FOCAL LENGTH,F1= 781.5752183

RING SET 25
W= 81.40033517
X= 75.71550705
Z= 70.41640877
M= 64.68165814
K= 60.13957339
```

```
W-X= 5.684828116
X-Z= 5.299098282
FOCAL LENGTH,F1= 781.9110157
```

In view of the fact that there may be some editorial error in the equations as set forth hereinabove, there accompanies this application as an exhibit a copy of applicant's handwritten notes deriving the equations, the notation in the handwritten notes being slightly different as follows:

| Exhibit Notation | FIG. 2 Notation |
|---|---|
| $R_1$ | $R_1 = W$ |
| $R_2$ | $R_2 - X$ |
| $R_3$ | $Z$ |

It is also to be observed that although the focal length of the concentrator is determined exclusively by the radius of curvature of the reflector discs, being about $\frac{1}{2}R$, the F# of the concentrator, i.e. the ratio of the focal length F to the diameter of the lens from perimeter to perimeter across the lens axis affects the intensity of radiation at the focus. If the F# is too small, i.e. the radius of curvature of the concentrator discs is too small compared to the concentrator diameter the number reflector ring sets will be small and radiation intensity at the focus will be low, and if the F# is too large, i.e. the radius of curvature of the concentrator discs is too large compared to the concentrator diameter, there will be too many ring sets and the radiation intensity at the focus will also be low. For optimum intensity $F=R_o$ or $F\#=\frac{1}{2}$. However for convenience of the user a longer focal length may be desirable; hence the range of F# 0.5 to 1.0 set forth above.

A patent search on a related invention revealed the following U.S. patents of the prior art:

U.S. Pat. No. 2,952,189—Pajes
U.S. Pat. No. 3,054,328—Rodgers
U.S. Pat. No. 3,364,676—Muller
U.S. Pat. No. 4,267,824—O'Halloran These patents disclose optical devices employing flexible material shaped by pressure differential. In the Pajes, Rodgers and Muller devices, the focus is on the same side of the device as the source. The O'Halloran device is a conical wave guide. None of these devices embodies opposed annular, esp. spherical, reflective belts.

I claim:
1. Radiation concentrator apparatus comprising:
a plurality of concentric sets of rings;
each ring set including a first ring and a second ring concentric therewith;
one side of each ring having a reflecting surface, and
support means positionable to support the rings in a certain position in which the reflecting surface of the second ring in each set is disposed to receive light reflected from the reflecting surface of the first ring in the respective set, incident on said reflecting surface of the first ring in the respective set in a parallel beam paraxial with the axis of the said rings, and to reflect such light to a common focus;
said common focus for all said ring sets being the same,
said support means when supporting said rings in said certain positions leaving paths between the second rings of the sets for such parallel light beams directed to the first rings of the sets and leaving paths between the first rings of the sets to said focus, said support means including transparent material between the rings.

2. Radiation concentrator apparatus comprising:

a plurality of concentric sets of rings;

each ring set including a first ring and a second ring concentric therewith;

one side of each ring having a reflecting surface, and support means positionable to support the rings in a certain position in which the reflecting surface of the second ring in each set is disposed to receive light reflected from the reflecting surface of the first ring in the respective set, incident on said reflecting surface of the first ring in the respective set in a parallel beam paraxial with the axis of the said rings, and to reflect such light to a common focus;

said common focus for all said ring sets being the same, said support means when supporting said rings in said certain positions leaving paths between the second rings of the sets for such parallel light beams directed to the first rings of the sets for light directed from the second rings of the sets to said focus, said support means being a balloon.

3. Concentrator according to claim 2 wherein said rings are belt shaped, portions of said balloon around said balloon having metalized surfaces interior to the balloon.

4. Concentrator according to claim 2 wherein said rings are belts of material secured to the interior of the balloon.

5. Concentrator according to claim 2 wherein said balloon comprises two pieces of flexible plastics material that in the unstressed state are flat discs, said discs being concentric and secured together at their outer peripheries.

6. Concentrator according to claim 5;

said balloon having a plurality of eyelets at the outer periphery of the discs.

7. Concentrator according to claim 6; including a frame and lacing means for passing though said eyelets and to connect to said frame to support said balloon.

8. Concentrator according to claim 5;

said balloon including an air inlet and outlet connected to the center of one of said discs.

9. Concentrator according to claim 5;

said balloon being made of Mylar plastics material.

10. Radiation concentrator apparatus comprising:

a plurality of concentric sets of rings;

each ring set including a first ring and a second ring concentric therewith;

one side of each ring having a reflecting surface, and support means positionable to support the rings in a certain position in which the reflecting surface of the second ring in each set is disposed to receive light reflected from the reflecting surface of the first ring in the respective set, incident on said reflecting surface of the first ring in the respective set in a parallel beam paraxial with the axis of the said rings, and to reflect such light to a common focus;

said common focus for all said ring sets being the same, the reflective surfaces of the first rings of the ring sets lying on a first spherical surface;

the reflecting surfaces of the second rings of the ring sets lying on a second spherical surface.

11. Concentrator according to claim 10;

said spherical surfaces intersecting at a radius $R_o$ from said axis of the rings;

the focus of said concentrator lying at a distance F, from said second spherical surface; where $F_1 = R_o$.

12. Radiation concentrator apparatus comprising:

a plurality of concentric sets of rings;

each ring set including a first ring and a second ring concentric therewith;

one side of each ring having a reflecting surface, and support means positionable to support the rings in a certain position in which the reflecting surface of the second ring in each set is disposed to receive light reflected from the reflecting surface of the first ring in the respective set, incident on said reflecting surface of the first ring in the respective set in a parallel beam paraxial with the axis of the said rings, and to reflect such light to a common focus;

said common focus for all said ring sets being the same, said support means when supporting said rings in said certain positions leaving paths between the second rings of the sets for such parallel light beams directed to the first rings of the sets for light directed from the second rings of the sets to said focus, each ring set lying in a spherical surface, said surfaces being coaxial and disposed with their concave sides adjacent forming a lens shaped configuration, said rings forming zones of the respective spherical surfaces, said zones being narrower near the axis of said surfaces and near the perimeter of the lens shaped configuration than at mid-locations therebetween.

13. Concentrator according to claim 12, the areas between said rings in each set forming further zones which are narrower near the axis of said surfaces and near the perimeter of the lens shaped configuration than at mid-locations therebetween.

14. Concentrator according to claim 13, the zones of the rings and of the interring areas at the mid-locations being greater in width than those near said axis and said perimeter by at least one order of magnitude.

15. Concentrator according to claim 14, the radii of the inner and outer perimeters of said rings being determined by the formulas for R, and $R_2$ and $R_3$ and the procedure A, B, and C for designing a concentrator set forth hereinabove in the description of the preferred embodiment.

* * * * *

UNITED STATES PATENT AND TRADEMARK OFFICE
CERTIFICATE OF CORRECTION

PATENT NO. : 4,552,126
DATED : NOVEMBER 12, 1985
INVENTOR(S) : JOHN O. BOYD

It is certified that error appears in the above—identified patent and that said Letters Patent is hereby corrected as shown below:

Column 3, line 46: after "the", change "valve" to -- value -- .

Column 3, line 54: after "the", change "valves" to -- values --.

Signed and Sealed this

Eighteenth Day of February 1986

[SEAL]

Attest:

DONALD J. QUIGG

Attesting Officer

Commissioner of Patents and Trademarks